United States Patent [19]

Fantone et al.

[11] Patent Number: 4,545,655
[45] Date of Patent: Oct. 8, 1985

[54] OPTICAL VIEWING SYSTEM

[75] Inventors: Stephen D. Fantone, Saugus; Bruce K. Johnson, Andover, both of Mass.

[73] Assignee: Polaroid Corporation, Cambridge, Mass.

[21] Appl. No.: 596,010

[22] Filed: Apr. 2, 1984

[51] Int. Cl.[4] .................. G02B 23/08; G02B 23/14; G02B 9/34; G03B 13/02
[52] U.S. Cl. .................................. 350/540; 350/537; 350/432; 350/469; 350/447; 354/225
[58] Field of Search .............. 350/540, 543, 542, 569, 350/501, 537, 545, 555, 556, 252, 432, 469, 447; 354/155, 219, 224, 225

[56] References Cited
FOREIGN PATENT DOCUMENTS

| 883664 | 6/1953 | Fed. Rep. of Germany | 350/540 |
| 890722 | 8/1953 | Fed. Rep. of Germany | 350/501 |
| 1098232 | 3/1959 | Fed. Rep. of Germany | 350/540 |
| 422907 | 7/1947 | Italy | 350/540 |
| 535474 | 11/1955 | Italy | 350/540 |
| 132303 | 9/1919 | United Kingdom | 350/540 |

Primary Examiner—Jon W. Henry
Attorney, Agent, or Firm—Francis J. Caufield

[57] ABSTRACT

An elongated optical system for use as a camera viewfinder. The system comprises four lens groups and four mirrors arranged around the second group to fold the system optical axis and provide for proper image orientation. Group power distribution is of form negative, positive, positive, and then positive with the first and second group structured to form an intermediate real image which is then viewable via the third and fourth groups. The viewfinder overall, however, is substantially afocal.

16 Claims, 7 Drawing Figures

*ASPHERIC

OPTICAL VIEWING SYSTEM

BACKGROUND OF THE INVENTION

1. Field of the Invention

This invention in general relates to optical devices and in particular to optical devices which are suitable for use as camera viewfinders.

2. Description of the Prior Art

Some of the most important, if not paramount, considerations for commercially successful cameras for use in amateur hand photography are cost and convenience and, as well, simplicity and reliability of operation. Also, cameras intended for use both indoors and outdoors by a relatively untrained individual desirably are lightweight and adapted for carrying or for safe storage when not in use, as on a shelf or in a drawer. These several requirements have been commonly met today by the use of molded plastics both for lenses and camera body parts because the specific gravity of plastics is low in comparison to glass and metallic materials.

For cameras of the class required for instant photography, other considerations enter as the arrangement of camera loading and print ejection and a restricted range on size because of requirements related to optical path volume. More particularly, the optical path volume tends to define basic geometry around which a camera must be designed and built. That is, a camera, whether with a straight or folded optical path, will have this basic size which ultimately must expand to accommodate all of its components such as shutter, viewfinder, film transport mechanism, and so forth. For minimum size and weight then, one task is to minimize those parameters for each component required while still meeting other fundamental needs.

For instant cameras, as in others, the optical path volume, i.e., the space bounded by the extreme bundle of rays surrounding what is to be photographed, is determined by the desired angular field coverage and print diagonal dimension. Print diagonals commonly practiced range in magnitude between 3 and 5 inches, more or less, and thus required objectives have equivalent focal lengths on the order of 115 mm. Thus, one arrives at a basic volume which is approximately a truncated cone shape with a base size related to the print diagonal and an altitude of approximately 115 mm. This, of course, may be folded through the use of mirrors and film loading and ejection arrangements, but otherwise is basically fixed. Consequently, the need can be appreciated for miniaturization of all other camera components wherever possible.

Viewfinders, a necessary component for aiming the camera and giving a visual indication of what is contained in the photograph, are usually either of the single lens reflex type relying in part on the camera objective lens for this purpose or the independent type which functions separate from the camera objective.

The independent types today are usually for aesthetic reasons built into the camera body and employ optical systems derived more or less indirectly from a Galilean telescope. However, the reversed Galilean form of viewfinder becomes less suitable where the length of the viewfinder tends to become large as in the case of instant camera structures. Here, as the separation between divergent and convergent groups increases, power adjustments force the magnification unacceptably downward. Moreover, reversed Galilean forms are afflicted with other problems such as distortion, limited field angle, field shifts and defocused field defining masks.

Other telescopic forms have been used and lengthened through the use of periscopic principles involving the use of field and relay lenses. These too suffer from narrow angular fields and are difficult to correct because of the need for extensive use of positive lenses.

It is thus a primary object of the present invention to provide an optical system suitable for use as a camera viewfinder.

It is another object of the present invention to provide an elongated, but otherwise minimal sized optical viewfinder device.

Yet another object of the present invention is to provide a well-corrected optical device having moderately large angular field coverage with minimum optical elements.

Other objects of the invention will, in part, be obvious and will, in part, appear hereinafter. The invention, accordingly, comprises the apparatus possessing the construction, combination of elements and arrangement of parts which are exemplified in the following detailed disclosure.

SUMMARY OF THE INVENTION

This invention in general relates to optical devices and in particular to optical devices suitable for use as viewfinders in cameras having moderately large picture diagonals and requiring relatively long, yet compact finders with normal angular field coverage.

The optical system of the invention meets such requirements with an overall optical path length approximating 7.0 inches and angular field coverage of approximately 45°. Four lens groups and four mirrors comprise the system with the four mirrors arranged around the second group to fold the system optical axis and provide for proper image orientation.

Group power distribution is of form negative, positive, positive, and then positive with the first and second groups structured to form an intermediate real image which is then viewable via the third and fourth groups.

Overall, the system is substantially afocal and well-corrected with its lens elements all of optical plastic and of minimum width.

BRIEF DESCRIPTION OF THE DRAWINGS

The novel features that are considered characteristic of the invention are set forth with particularity in the appended claims. The invention itself, however, both as to its organization and method of operation, together with other objects and advantages thereof, will be best understood from the following description of the illustrated embodiments when read in connection with the accompanying drawings wherein like numbers have been employed in the different figures to denote the same parts and wherein:

DETAILED DESCRIPTION

The present invention in general relates to optical devices and in particular to optical systems suitable for use as viewfinders in cameras having moderately large picture formats and requiring relatively long, yet compact finders with normal angular field coverage. Thus, the present invention relates to both the optical design of a viewfinder system and to aspects of the integration of that design into a viewfinder assembly for use with a camera.

Figure 1:
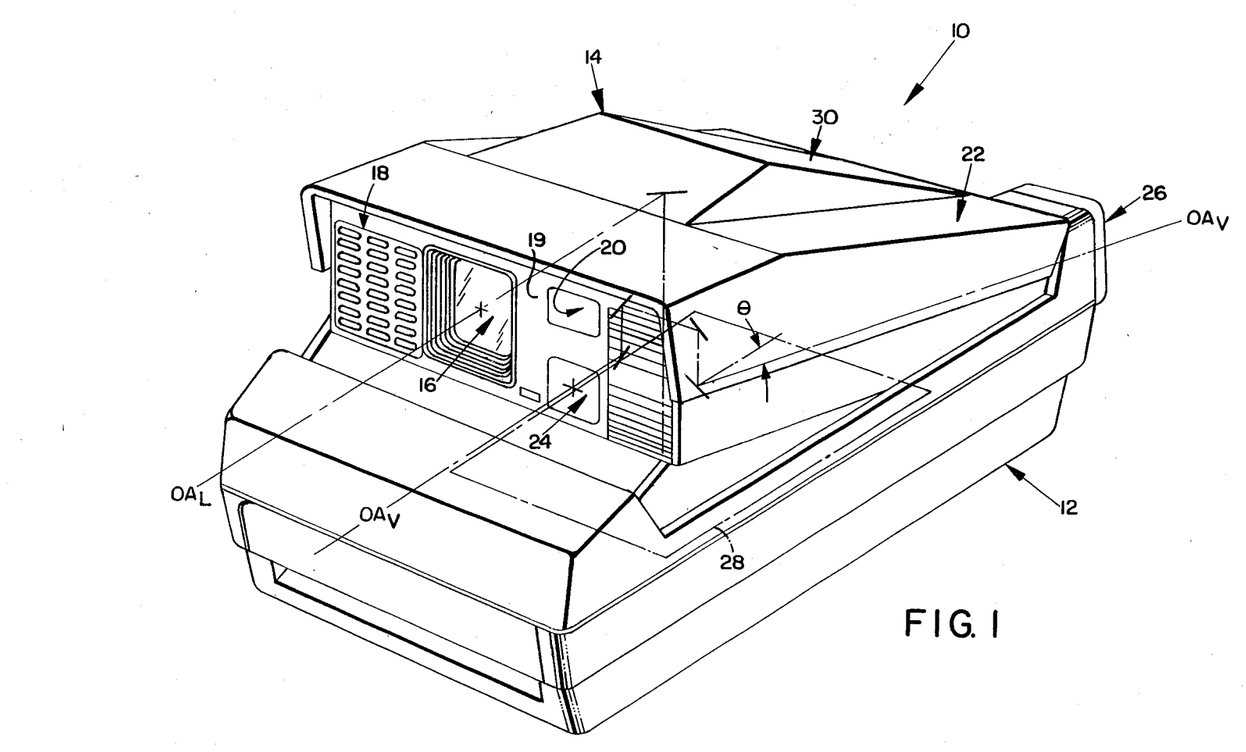
FIG. 1 is a perspective view of a folding camera which uses instant film and appears illustrated unfolded, ready for picture taking.

Referring now to FIG. 1, there is shown a camera 10 which is adapted in a well-known manner to accept instant or self-processable film of moderate format. The camera 10 comprises two major sections, lower body 12 and upper body 14, which are pivotally hinged about their aft ends in a well-known manner for relative rotation in clamshell-like fashion to allow the camera 10 to be folded into a compact condition (not shown) for storage and an unfolded condition in which pictures are taken. In FIG. 1, the camera 10 is as it would appear ready for taking pictures.

Upper body 14 includes a forward or scene facing, vertical wall 19 which contains a number of openings for parts or access to parts of various camera systems. Among these openings is one to the extreme left in which there is a sonar transducer 18 which forms part of an automatic rangefinding system. In the center is an opening for the camera objective taking lens 16 which is arranged along optical axis $OA_L$. Optical axis, $OA_L$, is folded with a mirror which resides in an internal cone-like structure (neither shown) and terminates in the center of the camera film plane shown at 28. The diagonal of the film plane is within the commonly used range of 3 to 5 inches, more or less, and the focal length of objective taking lens 16 is approximately 115 mm to provide a normal full field coverage of around 50 degrees.

To the upper right of the objective lens 16 is an opening 20 which serves as an entrance window for the camera exposure control system and directly beneath that is another opening 24 which is the entrance window to the viewfinder system of the invention.

Figure 2:
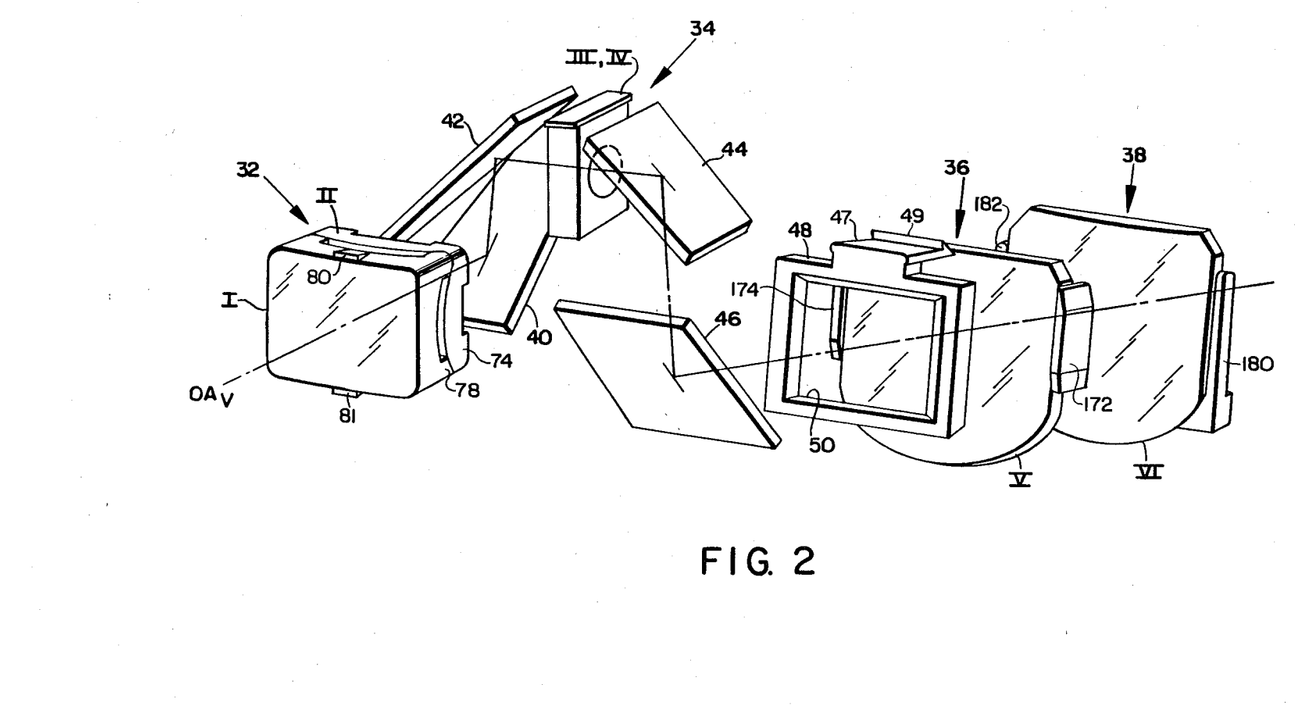
FIG. 2 is a perspective view of the optical components of the invention arranged along a folded optical axis, $OA_V$, as a system suitable for use as the viewfinder for the camera of FIG. 1.
Figure 4:
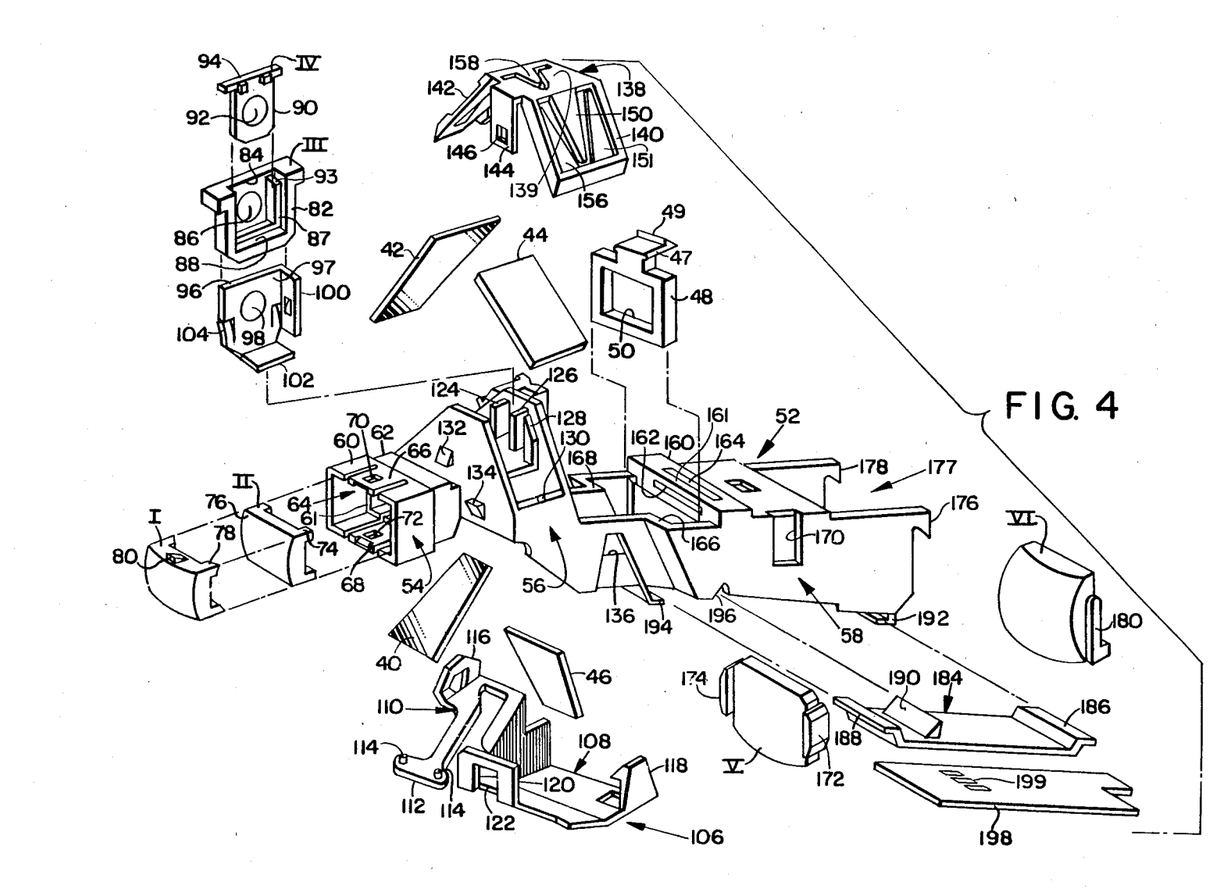
FIG. 4 is an exploded perspective view of a housing and associated retainers by which the optical components of FIG. 2 are physically connected to form a viewfinder assembly.

The optical system of the invention, shown in perspective in FIG. 2 and in an exploded assembly in FIG. 4, is arranged along a multiply folded optical axis, $OA_L$, and resides in the camera 10 in a region designated generally at 22 which is under the upper right hand corner of the upper body 14 and extends lengthwise from the vertical wall 19 aft, terminating at an eyecup 26. The last leg of the optical path, $OA_L$, is seen offset with respect to the entrance window 24 and angled downward by an angle, $\theta$, from the horizontal.

The overall length of the camera lower body 12 is approximately 6½ inches and that of the upper body 14, from its vertical wall 19 to just before the eyecup 26, is about 5¼ inches, thus requiring a rather long viewfinder capable of fitting into the region 22 along with other camera system components.

As seen in FIG. 2, the optical system of the invention comprises four major lens groups, 32, 34, 36 and 38, respectively; four plano mirrors, 40, 42, 44 and 46; and an image mask 48 having an opening 50.

Figure 3:
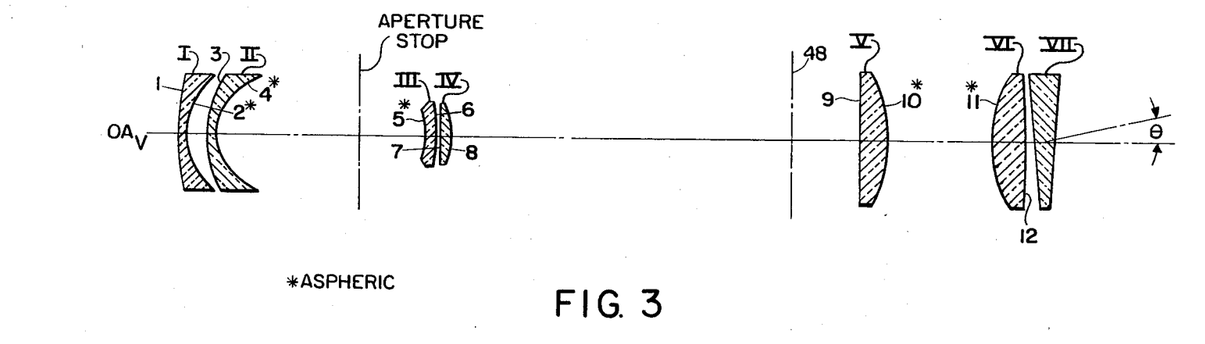
FIG. 3 is a cross-sectional view of the optical system of FIG. 2 shown unfolded and with certain parts deleted.

The power distribution among the four major lens groups, 32-38, is in form negative, positive, positive and then positive. FIG. 3 permits the power distribution to be visualized more easily, showing the lens group individual element curvatures and spacings with the system unfolded, without the plano mirrors, 42-46, but with a prism 39 which can be part of the fourth major lens group 38. The purpose of the prism 39 is for deviating an observer's line of sight from the horizontal into coincidence with the last leg of the optical axis, $OA_L$. This refraction occurs when the eye looks into the camera eyecup 26 in which case the line of sight is deviated upwards by the angle, $\theta$. With regard to mounting, the prism 39 is preferably mounted as a separate element, forward of the eyecup 26, in any well-known manner.

The first lens group 32 includes two elements, I and II, which are both negative and meniscus in form. Each rear surface of elements I and II is aspheric and both elements, I and II, are structured to be aplanatic and curved about the system aperture stop.

For reduction of vignetting and minimization of the size of elements III and IV, which comprise the second lens group 34, the aperture stop is preferably made close to surface 5 of element II, but can move forward of this location, but by no more than one-third the distance separating groups 32 and 34.

Elements I and II are generally structured in the foregoing manner to operate to form a virtual image of the photographic scene which is then imaged by the second positive lens group 34 as a real image at the location of the mask 48 and at the dimensions of the mask aperture 50.

Element III is meniscus with its rear surface 6 aspheric and element IV is of plano-convexo form, both operating to provide the second lens group 34 with overall positive power.

The real image formed by the first and second lens groups, 32 and 34, is observable via the third and fourth lens groups, 36 and 38, which taken together are focused on the mask aperture 50. These two groups are structured to operate to form a substantially collimated or slightly converging image of the photographic scene, making the optical system overall afocal or nearly so.

Constructional data for a preferred example in quantitative detail is given in the following table with reference to FIG. 3.

| Element | Surface | Radius | Separation Medium | Air | $N_d$ | $V_d$ |
|---|---|---|---|---|---|---|
| I | 1 | 3.5959 | .0854 | | 1.4917 | 57.2 |
| | 2* | .5463 | | .2136 | | |
| II | 3 | 1.2433 | .0854 | | 1.4917 | 57.2 |
| | 4* | .7212 | | 2.0962 | | |
| III | 5* | −3.2708 | .0854 | | 1.4917 | 57.2 |
| | 6 | −2.1673 | | .0142 | | |
| IV | 7 | −891.8444 | .0854 | | 1.4917 | 57.2 |
| | 8 | −.9827 | | 4.3788 | | |
| V | 9 | plano | .2534 | | 1.4917 | 57.2 |
| | 10* | −2.079 | | 1.237 | | |
| VI | 11* | 1.6637 | .3080 | | 1.4917 | 57.2 |

-continued

| Element | Surface | Radius | Separation Medium | Separation Air | $N_d$ | $V_d$ |
|---|---|---|---|---|---|---|
| | 12 | −4.5623 | | | | |

*aspheric in which said surfaces are numbered in their order from object to image space, said radii and separations are normalized with respect to the combined focal length, $f_o$, of said first through said fourth element, $N_d$ is the index of refraction, $V_d$ is the Abbe dispersion number and wherein surfaces 2, 4, 5, 10 and 11 are aspheric in shape and have the general formula:

$$Z = \frac{CS^2}{1 + \sqrt{1 - (K + 1)C^2S^2}} + \beta S^4 + \gamma S^6 + \delta S^8 + \epsilon S^{10}$$

where C is the reciprocal of the surface apex radius, Z represents the distance of a point on the aspheric surface measured from the surface vertex and parallel to the Z-axis taken to be the optical axis, S is the radial distance of the point measured perpendicular to the Z-axis and wherein the coefficients, $\beta$ through $\epsilon$, and the conic constant K, normalized to $f_o$ are:

| | Surface | | | | |
|---|---|---|---|---|---|
| | 2 | 4 | 5 | 10 | 11 |
| K | −2.0596 | 0.0 | 0.0 | 0.0 | 0.0 |
| beta | 0.0 | 1.3122 | −1.6966 × $10^{-1}$ | 0.0 | −4.3989 × $10^{-2}$ |
| gamma | 0.0 | 0.0 | −3.3069 × $10^{-2}$ | 0.0 | −3.0754 × $10^{-3}$ |
| delta | 0.0 | 0.0 | 0.0 | 0.0 | 0.0 |
| epsilon | 0.0 | 0.0 | 0.0 | −9.3215 × $10^{-2}$ | 0.0 |

The material for all elements of this example is preferably plexiglass, but can be any other low dispersion material of suitable index. The two front lens groups and the two back are for reasons to follow of themselves corrected for distortion. Mirrors 40-46 operate to fold the optical axis, $OA_L$, four times to promote compactness and provide for proper image orientation.

Figure 5:
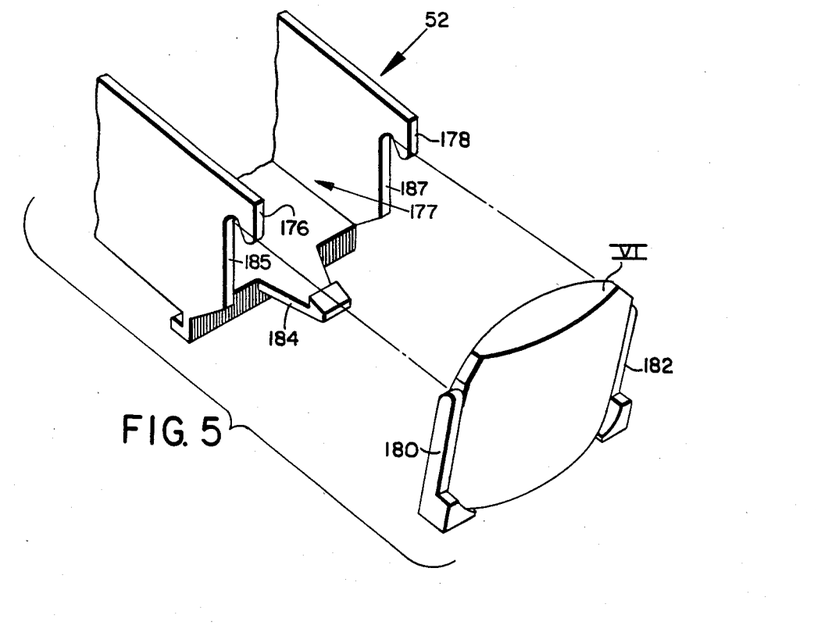
FIG. 5 is an enlarged, left rear, perspective view of a part of the housing and a lens component of FIG. 4.
Figure 6:
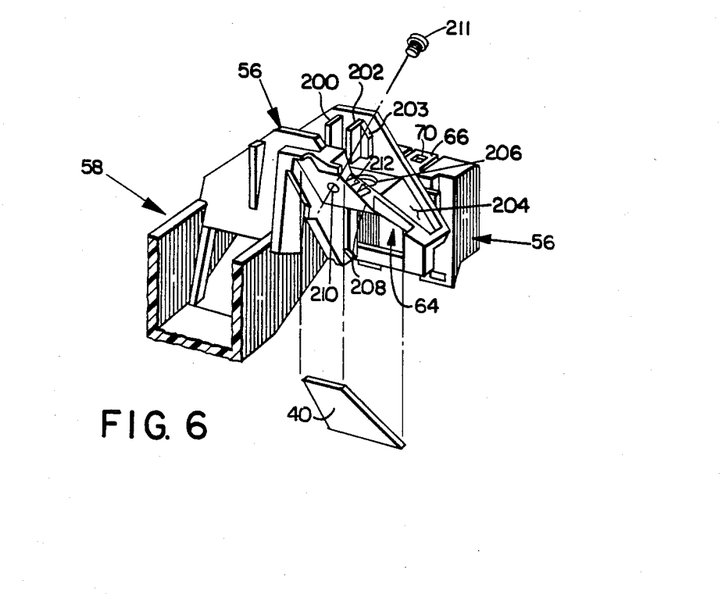
FIG. 6 is an enlarged, right rear, perspective view of the forward part of the housing and a mirror of FIG. 4.

The optical system parts are adapted in a manner to be described to fit together with other components to form a viewfinder assembly as best seen in FIGS. 4, 5 and 6.

The general characteristics of the viewfinder assembly are that it is fabricated virtually exclusively of injection molded plastics and includes a housing, the optical system four lens groups and mirrors, and mirror retainers. All of its components are structured to snapfit together such that the optical components of the assembly are automatically nominally positioned when connected in the housing. Adjustment features for lens tilt and horizontal framing are also provided and, as well, means for displaying visual information in the viewing field.

Specifically, the assembly comprises an elongated housing 52 having open ends 64 and 177 fore and aft, respectively. The housing 52 is injection molded of a suitable glass filled thermoplastic such as 30% filled polycarbonate for dimensional stability and includes three major sections, a forward section 54 which faces the scene, a prismatic midsection 56 for receiving the optical system mirrors, 40-46 and the second lens group 34, and an aft section 58 which extends rearwardly and downwardly along the angle, $\theta$ and is adapted to receive the optical system third and fourth lens groups, 36 and 38, respectively, and visual indicating means to be identified.

Forward housing section 54 includes a forward rectangular section 60 and a rearward one 62 which is dimensioned to fit into the forward one 60 to form a seating surface, partially shown at 61, where these two sections interface.

The lens element II is provided with four bosses 74 which project rearwardly from its four corners and seat on the surface 61, and lens element I also has four rearwardly projecting bosses 78 which seat in complementary configured surfaces 76 on lens element II.

Both lens elements I and II are retained in the forward housing section 54 with a snap-fit retainer arrangement. At the top and bottom of the section 60 are flexible cantilevered fingers 66 and 68, respectively, each of which is provided with a hole, 70 and 72 respectively, and are otherwise adapted to deflect outwardly in the presence of lateral loads.

Lens element I includes two wedge sections, 80 and 81, located in its top and bottom respectively, (see FIG. 2), which cam the flexible fingers, 66 and 68, apart as the lens elements I and II are inserted into section 60 and then drop into the holes 70 and 72 to retain the lens elements, I and II, in place. The deflection of these flexible fingers, 66 and 68, is made, along with all other snap-fit assembly features to be described, so as not to be overstressed during assembly. This assures elastic performance and ease of disassembly if required.

Mid housing section 56 as best seen in FIGS. 4 and 6 is adapted to receive and retain therein the four mirrors, 40-46, and the lens elements III and IV of the second lens group 34 as a drop-in subassembly.

The optical surfaces of lens elements III and IV are formed as an integral part of two separate parts, 82 and 90, respectively, adapted to fit together in complementary fashion. The active optical areas are designated at 86 and 92, respectively, and it is these areas which are in the forms of the refracting surfaces of these elements as shown in FIG. 3 and as described previously.

Part 82 is formed with a recess 84 in which there is a U-shaped section 87 that defines in conjunction with the rear surface of part 82 a second recess 88 that is depressed below the rear surface of part 82.

Part 90 fits into the recess 88 and is positioned vertically with a tee member 94, the ends of which bear against seating areas 93 (only one shown) at the top of section 87 of part 82.

Both parts, 82 and 90, fit into a spring retainer 96 which includes a vertical front wall 97 having a clear aperture 98, a horizontal base wall 102, and a vertical side wall 100. Front wall 97 and side wall 100 have flexible fingers shown typically at 104.

Now, in the housing 56 there is a vertically facing channel formed between four upstanding posts 124, 126, 200 and 202 (FIG. 6). The drop-in subassembly slides into this channel and is loaded by the spring fingers 104 so that it is positioned laterally of the optical axis, $OA_L$, and the rear surface of part 82 seats against the forward facing surfaces of the posts 126 and 200 to position this subassembly axially.

Mirrors 42 and 44 drop into the top of housing section 56 and seat on three point mounts which orient them in planes of 45 degrees. As seen in FIG. 4, the mirror 44, which is rectangular, mounts on two upper posts 128

(one shown) adjacent posts 126 and 200 and on a boss 130.

Mirror 42, which is trapezoidal, mounts also in a plane, which is also defined by a three point mount. As best seen in FIG. 6, this mount includes surfaces 203 (one shown) adjacent posts 202 and 124 and boss 204.

Mirrors 42 and 44 are retained against their mounting planes by an upper mirror retainer 138 shown best in FIG. 4. The retainer 138, a glass filled injection molded piece, includes a top piece 139 having depending therefrom slanted side pieces 140 and 142 and flexible fingers 144 (one shown) which extend downwardly and are provided with apertures 146.

In side piece 140 are flexible fingers 150, 151 and 156 corresponding to the three points for defining the mounting plane for mirror 44 and in top piece 139 is a flexible finger 139 corresponding to the top mid point of the tee 94 of part 90. Side piece 142 is also provided with flexible fingers in the above manner and partially seen for the three point mount for mirror 42.

On either side of section 56 are wedges 132 (one only shown) which separate the flexible fingers 144 and fit into their holes 146 as decribed before to connect the mirror retainer 139 to housing section 56 thereby keeping the mirrors 42 and 44, firmly in place against their three point mounting planes.

In FIG. 6 there is seen provided in housing section 56 an aperture 206 over which the mirror 42 resides when in place, and this aperture 206 serves as the aperture stop for the optical system as previously described and seen in FIG. 3.

A lower mirror retainer 106 is provided as an injection molded part for retaining the mirrors 40 and 46 in place. Although somewhat different in geometry than the retainer 139, the retainer 106 is similar to it in principle of operation. As seen in FIG. 4, retainer 106 has two major sections, 108 and 110. Section 108 is for mirror 46 which mounts facing rearwardly and downwardly from 45 degrees to provide the angle, $\theta$, and section 110 is for mirror 40 which faces forwardly and is adjustable in a manner to be described for accommodating for any tilt errors of the lens elements in the first and second lens groups, 32 and 34.

Retainer 106 snaps onto the housing 52 via flexible fingers 116 and 118 located respectively on sections 110 and 108. Flexible finger 118 fits into an aperture 136 located in the vertical right side wall of rear housing section 58 and finger 116 snaps around wedges 212 pictured in FIG. 6.

Mirror 46 seats on a three point mounting plane of the sort previously described, but not now shown, and mirror 40 seats on a three point mounting plane in which one point is moveable to provide tilt adjustment. The bosses 114 located on a flexible finger 112, formed as part of the lower retainer section 110, bear against two of the points in the section 56, and the third point, which is adjustable, is provided in the form of an adjustment screw 211 which fits into threaded hole 210 (FIG. 6).

Lens V snaps into the rear housing section 58 from its underside and for this purpose is provided on either side with a pair of wedge-shaped ears 172 and 174 which cam apart the side walls of the rear housing section 56 and fit into a pair of vertical slots 170 (only one shown) dimensioned to receive them.

Lens VI, shown in FIG. 5, fits into the open end 177 of rear housing section 58 through the use of side posts 180 and 182 along with corresponding hook sections 176 and 178, respectively, and a flexible finger 184. Here, the upper surfaces of the side posts 180 and 182 are rounded to fit the inner surfaces of the hooks 176 and 178 which then act as bearing surfaces about which the lens element VI is rotated until its lower edges are captured by the flexible finger 184. This completed, the forward facing surfaces of the side posts 180 and 182 are seated against respective rearward facing surfaces 185 and 187 of the ends of the housing section 58. With this arrangement, lens VI is securely positioned in place.

Mask 48 is placed in the rear housing section 58 in the following way. As seen in FIG. 4, the rear housing section 58 includes, across its top opening, a cross-member 160 which has provided in it a pair of slots 162 and 164 which intersect one another in a common space inside of cross-member 160. Mask 48 has a rearward projection 47 which fits into slot 162 and flexes a portion 161 of cross-member 160 vertically via a wedge section 49 which then projects through slot 164. Since the width of section 47 is narrower than that of the slots 162 and 164, the mask 48 is free to slide horizontally, thereby making it adjustable in this direction. After being adjusted properly so that the viewfinder horizontal field is correct, the mask 48 with this arrangement is automatically fixed in place.

Means for displaying visual information are provided in the form of a circuit board 198 having integrated therewith light emitting diodes 199 or the like coded to provide the camera user with indications of the state of various camera functions or scene characteristics. The circuit board mounts with a mounting board 184 with the diodes 199 registered in optical communication with a prism 190 located atop the board 184. These two components may be joined in any well-known manner. The board 184 has a pair of upwardly depending elongated end sections 186 and 188 which slide into complementary configured slots 192 and 194 provided in the rear housing section 58 for this purpose. Note also the presence in rear housing section 58 of a wedge shaped cutout 196 which provides clearance for the prism 190.

When the board 184 is in place in the rear housing secton 58, the prism 190 is in position with its rearwardly facing surface in the plane of the real image formed by the first and second lens groups, 32 and 34, and is arranged to direct light from the diodes 199 into the third lens group 36 where this light can then be seen by an observer in the field of the optical system without distortion since the third and fourth lens groups, 36 and 38, are corrected together to be distortion-free, primarily by the strong higher order aspheric terms of surface 10, and are focused also on this real image plane.

Figure 7:
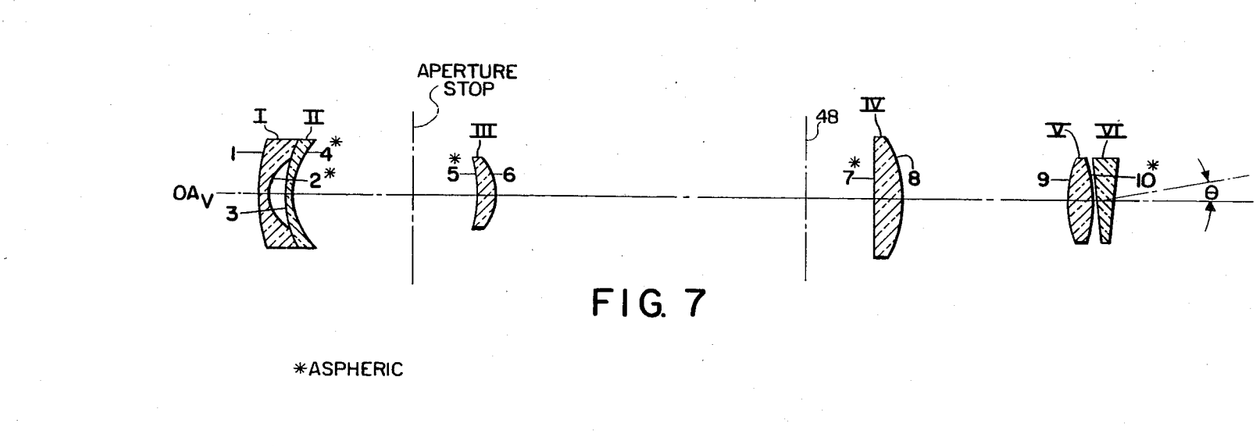
FIG. 7 is a cross-sectional view of an unfolded, alternate, optical system which can be used with the camera of FIG. 1.

An alternate optical system design in accordance with the principles of the invention is shown in cross-section unfolded fashion and without any mirrors in FIG. 7. This alternate has the following constructional data:

| Element | Surface | Alternate Optical System Example | | | |
| | | Radius | Separation | | |
| | | | Medium | Air | $N_d$ | $V_d$ |
|---|---|---|---|---|---|---|
| I | 1 | 3.2650 | .0608 | | 1.4917 | 59.2 |
| | 2* | 0.4697 | | .1825 | | |
| II | 3 | 1.1289 | .0608 | | 1.4917 | 59.2 |
| | 4* | 0.6263 | | 1.7779 | | |
| III | 5* | −2.7873 | .1216 | | 1.4917 | 59.2 |
| | 6 | −0.6143 | | 3.8863 | | |
| IV | 7* | plano | .2311 | | 1.4917 | 59.2 |
| | 8 | −1.5206 | | 1.6469 | | |

-continued

| | | Alternate Optical System Example | | | | |
|---|---|---|---|---|---|---|
| Ele-ment | Sur-face | Radius | Separation Medium | Air | $N_d$ | $V_d$ |
| V | 9 | 1.2165 | .1825 | | 1.4917 | 59.2 |
| | 10* | −9.1068 | | | | |

*aspheric in which said surfaces are numbered in their order from object to image space, said radii and separations are normalized with respect to the combined focal length, $f_o$, of said first through said third element, $N_d$ is the index of refraction, $V_d$ is the Abbe dispersion number and wherein surfaces 2, 4, 5, 7 and 10 are aspheric in shape and have the general formula:

$$Z = \frac{CS^2}{1 + \sqrt{1 - (K+1)C^2S^2}} + \beta S^4 + \gamma S^6 + \delta S^8 + \epsilon S^{10}$$

where C is the reciprocal of the surface apex radius, Z represents the distance of a point on the aspheric surface measured from the surface vertex and parallel to the Z-axis taken as the optical axis, S is the radial distance of the point measured perpendicular to the Z-axis and wherein three coefficients, $\beta$ through $\epsilon$, and the conic constant K, normalized to $f_o$ are:

| | Surface | | | | |
|---|---|---|---|---|---|
| | 2 | 4 | 5 | 7 | 10 |
| K | −2.3073 | 0.0 | −4.2598 × $10^{-1}$ | 0.0 | 0.0 |
| beta | 0.0 | 1.8387 | −5.4764 × $10^{-1}$ | −3.9491 × $10^{-2}$ | 9.0058 × $10^{-2}$ |
| gamma | 0.0 | 0.0 | −1.4393 × $10^{-1}$ | 9.7311 × $10^{-3}$ | −5.4472 × $10^{-2}$ |
| delta | 0.0 | 0.0 | 9.8715 × $10^{-1}$ | 0.0 | 0.0 |
| epsilon | 0.0 | 0.0 | 0.0 | 0.0 | 0.0 |

From FIG. 7 and the tabular constructional data, it can be seen that the alternate optical system has one less element in its second lens group and the element used, element III here, is positive and of meniscus form. The other elements are in form similar to the first example and again all are made of optical quality plexiglass.

Obviously, the foregoing examples may be rescaled, and in this process it is required to determine numerical values to go with the rescaling for the new physical size.

It will be obvious to those skilled in the art that other changes may be made in the above-described embodiments without departing from the scope of the invention. Therefore, it is intended that all matter contained in the above description or shown in the accompanying drawings shall be interpreted as illustrative and not in a limiting sense.

What is claimed is:

1. An optical system arranged along an optical axis, said optical system comprising, from object to image space:
   a first lens group consisting of at least one element of negative power including at least one aspheric surface;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups.

2. The optical system of claim 1 wherein said element of said first lens group is a meniscus of convexo-concave form.

3. An optical system arranged along an optical axis, said optical system comprising, from object to image space:
   a first lens group consisting of at least one element of negative power;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups,
   said optical system's optical path being folded four times.

4. The system of claim 3 wherein said optical system further includes four plano mirrors, one each for each of said folds in said optical path.

5. The optical system of claim 4 wherein said mirrors are arranged with respect to said lens groups to fold said optical path, when viewed from image space, first up, then to the left, then down, and finally rearwardly and downwardly so that the final leg of said optical path is offset and skewed with respect to its initial leg.

6. The optical system of claim 5 wherein said fourth lens group further includes a prism to compensate for the skew in said final leg of said optical path.

7. The optical system of claim 4 wherein said four mirrors are arranged around said second lens group.

8. A multi-element optical system arranged along an optical axis and having constructional data substantially as follows:

| Ele-ment | Sur-face | Radius | Separation Medium | Air | $N_d$ | $V_d$ |
|---|---|---|---|---|---|---|
| I | 1 | 3.5959 | .0854 | | 1.4917 | 59.2 |
| | 2* | .5463 | | .2136 | | |
| II | 3 | 1.2433 | .0854 | | 1.4917 | 59.2 |
| | 4* | .7212 | | 2.0962 | | |
| III | 5* | −3.2708 | .0854 | | 1.4917 | 59.2 |
| | 6 | −2.1673 | | .0142 | | |
| IV | 7 | −891.8444 | .0854 | | 1.4917 | 59.2 |
| | 8 | −.9827 | | 4.3788 | | |
| V | 9 | plano | .2534 | | 1.4917 | 59.2 |
| | 10* | −2.079 | | 1.237 | | |
| VI | 11* | 1.6637 | .3080 | | 1.4917 | 59.2 |
| | 12 | −4.5623 | | | | |

*aspheric in which said surfaces are numbered in their order from object to image space, said radii and separations are normalized with respect to the combined focal length, $f_o$, of said first through said fourth element, $N_d$ is the index of refraction, $V_d$ is the Abbe dispersion number and wherein surfaces 2, 4, 5, 10 and 11 are aspheric in shape and have the general formula:

$$Z = \frac{CS^2}{1 + \sqrt{1 - (K+1)C^2S^2}} + \beta S^4 + \gamma S^6 + \delta S^8 + \epsilon S^{10}$$

where C is the reciprocal of the surface apex radius, Z represents the distance of a point on the aspheric surface measured from the surface vertex and parallel to the Z-axis, S is the radial distance of the point measured perpendicular to the Z-axis and wherein the coefficients, $\beta$ through $\epsilon$, and the conic constant K, normalized to fo are:

| | Surface | | | | |
|---|---|---|---|---|---|
| | 2 | 4 | 6 | 10 | 11 |
| K | −2.0596 | 0.0 | 0.0 | 0.0 | |
| beta | 0.0 | 1.3122 | −1.6966 × $10^{-1}$ | 0.0 | −4.3989 × $10^{-2}$ |
| gamma | 0.0 | 0.0 | −3.3069 × $10^{-2}$ | 0.0 | −3.0754 × $10^{-3}$ |
| delta | 0.0 | 0.0 | 0.0 | 0.0 | 0.0 |
| epsilon | 0.0 | 0.0 | 0.0 | −9.3215 × $10^{-2}$ | 0.0 |

9. A multi-element optical system arranged along an optical axis and having constructional data substantially as follows:

| Element | Surface | Radius | Separation Medium | Separation Air | $N_d$ | $V_d$ |
|---|---|---|---|---|---|---|
| I | 1 | 3.2650 | .0608 | | 1.4917 | 59.2 |
| | 2* | 0.4697 | | .1825 | | |
| II | 3 | 1.1289 | .0608 | | 1.4917 | 59.2 |
| | 4* | 0.6263 | | 1.7779 | | |
| III | 5* | −2.7873 | .1216 | | 1.4917 | 59.2 |
| | 6 | −0.6143 | | 3.8863 | | |
| IV | 7* | plano | .2311 | | 1.4917 | 59.2 |
| | 8 | −1.5206 | | 1.6469 | | |
| V | 9 | 1.2165 | .1825 | | 1.4917 | 59.2 |
| | 10* | −9.1068 | | | | |

*aspheric in which said surfaces are numbered in their order from object to image space, said radii and separations are normalized with respect to the combined focal length, fo, of said first through said fourth element, $N_d$ is the index of refraction, $V_d$ is the Abbe dispersion number and wherein surfaces 2, 4, 5, 7 and 10 are aspheric in shape and have the general formula:

$$Z = \frac{CS^2}{1 + \sqrt{1 - (K+1)C^2S^2}} + \beta S^4 + \gamma S^6 + \delta S^8 + \epsilon S^{10}$$

where C is the reciprocal of the surface apex radius, Z represents the distance of a point on the aspheric surface measured from the surface vertex and parallel to the Z-axis, S is the radial distance of the point measured perpendicular to the Z-axis and wherein three coefficients, $\beta$ through $\epsilon$, and the conic constant K, normalized to fo are:

| | Surface | | | | |
|---|---|---|---|---|---|
| | 2 | 4 | 5 | 7 | 10 |
| K | −2.3073 | 0.0 | −4.2598 × $10^{-1}$ | 0.0 | 0.0 |
| beta | 0.0 | 1.8387 | −5.4764 × $10^{-1}$ | −3.9491 × $10^{-2}$ | 9.0058 × $10^{-2}$ |
| gamma | 0.0 | 0.0 | −1.4393 × $10^{-1}$ | 9.7311 × $10^{-3}$ | −5.4472 × $10^{-2}$ |
| delta | 0.0 | 0.0 | 9.8715 × $10^{-1}$ | 0.0 | 0.0 |
| epsilon | 0.0 | 0.0 | 0.0 | 0.0 | 0.0 |

10. An optical system arranged along an optical axis, said optical system comprising, from object to image space:
   a first lens group consisting of at least one element of negative power;
   a second lens group consisting of at least one element of positive power including at least one aspheric surface, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups.

11. An optical system arranged along an optical axis, said optical system comprising, from object to image space:
   a first lens group consisting of at least one element of negative power;
   a second lens group consisting of at least two elements of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups.

12. An optical system arranged along an optical axis, said optical system comprising, from object to image space:
   a first lens group consisting of at least two elements of negative power, both of which are meniscii of convexo-concave form;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups.

13. An optical system arranged along an optical axis, said optical system comprising, from object to image space:
   a first lens group consisting of at least one element of negative power;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups,
   one element of each lens group of said optical system having at least one aspheric surface.

14. An optical system arranged along an optical axis, said optical system comprising, from object to image space:
   a first lens group consisting of at least one element of negative power;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups,
   said optical system's aperture stop being between said first and second lens groups.

15. The optical system of claim 14 wherein said aperture stop is located ahead of said second lens group by a distance which does not exceed one third of the distance separating said first and second lens groups.

16. An optical system arranged along an optical axis, said optical system comprising, from object to image space:
   a first lens group consisting of at least two elements of negative power, each of which is aspheric;
   a second lens group consisting of at least one element of positive power, the powers of said first and second groups, and the spacing therebetween being such that said groups in combination are convergent, forming a real image in a predetermined plane located behind said second group;
   a third lens group consisting of at least one element of positive power; and
   a fourth lens group consisting of at least one element of positive power, the powers of said third and fourth groups and the spacing therebetween being such that said third and fourth groups form a substantially collimated image of said real image formed by said first and second groups.

* * * * *